(12) United States Patent
Prasad et al.

(10) Patent No.: US 8,767,888 B2
(45) Date of Patent: Jul. 1, 2014

(54) EFFICIENT SQUARE-ROOT FREE 2 SYMBOL MAX-LOG RECEIVER

(75) Inventors: Narayan Prasad, Wyncote, PA (US);
Neda Cvijetic, Plainsboro, NJ (US);
Sampath Rangarajan, Bridgewater, NJ (US); Ting Wang, W. Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 351 days.

(21) Appl. No.: 13/433,873

(22) Filed: Mar. 29, 2012

(65) Prior Publication Data
US 2012/0250804 A1 Oct. 4, 2012

Related U.S. Application Data

(60) Provisional application No. 61/469,240, filed on Mar. 30, 2011.

(51) Int. Cl.
*H04L 27/06* (2006.01)
*H04L 25/02* (2006.01)
*H04L 25/06* (2006.01)
*H04L 25/03* (2006.01)

(52) U.S. Cl.
CPC .......... *H04L 25/0246* (2013.01); *H04L 25/067* (2013.01); *H04L 25/03171* (2013.01)
USPC .......................................................... 375/341

(58) Field of Classification Search
USPC .................... 375/341, 148; 704/256; 714/780
See application file for complete search history.

(56) References Cited

U.S. PATENT DOCUMENTS

| 5,778,341 | A | * | 7/1998 | Zeljkovic | ...................... 704/256 |
| 7,443,908 | B2 | * | 10/2008 | Simoni et al. | ................. 375/148 |
| 7,734,990 | B2 | * | 6/2010 | Maru | ............................ 714/780 |

* cited by examiner

*Primary Examiner* — Daniel Washburn
*Assistant Examiner* — Fitwi Hailegiorgis
(74) *Attorney, Agent, or Firm* — Joseph Kolodka

(57) ABSTRACT

The present invention employs a look up table based implementation for the metric computations which eliminate redundancy and substantially reduce the number of multiplications. Moreover, inventive method exploits the fact that the un-normalized constellation symbols are complex integers so that the product of a real-number and an un-normalized constellation symbol can be implemented by only additions. The inventive method also enables a greater efficiency for whitening colored noise prior to demodulation, one of which involves no square-root operation. The invention results in less complexity, faster operation, lower power consumption, without sacrificing performance.

20 Claims, 2 Drawing Sheets

__US 8,767,888 B2__

EFFICIENT SQUARE-ROOT FREE 2 SYMBOL MAX-LOG RECEIVER

RELATED APPLICATION INFORMATION

This application claims priority to provisional application Ser. No. 61/469,240 filed on Mar. 30, 2011, the contents thereof are incorporated herein by reference.

BACKGROUND

The present invention relates to wireless communications and, more particularly, to an efficient square-root free 2 symbol max-log receiver.

In several communication scenarios the following receiver (demodulator) design problem is ubiquitous. Consider a received signal vector z that has 2 complex-valued elements and can be expressed as:

$$z=Hs+n \quad \text{(Equation)}$$

where, s is the transmit symbol vector having 2 complex-valued elements, each drawn from a normalized constellation. The matrix H models the channel and the vector n models the additive independent noise, assumed to have complex Gaussian elements of unit variance. Then given z and H and the constellation(s) from which the elements of s are drawn, the receiver (demodulator) design problem is to determine the optimal hard decision about s and/or the optimal soft decisions (log-likelihood ratios) about the coded bits mapped to s.

One approach to solving the above problem, the brute-force way, to determine either the hard or soft decisions is to list out all possibilities of s and compute associated metrics. This method has a very high complexity which scales as $O(M^2)$, where M is the constellation size and is considered to be impractical. A better approach was consequently developed in U.S. patent application Ser. No. 11/857,269, inventors: Prasad et al., entitled "Max_Log Receiver For Multiple Input Multiple output (MIMO) Systems". In this technique, the demodulator involves twice linearly transforming the received signal vector to obtain new transformed vectors that can be modeled as in the above Equation, but where the transformed channel matrices have a triangular structure. The transformed vectors are then used for metric computations after exploiting the induced triangular structure in the transformed channel matrices. Determining the matrices used for these two linear transformations as well as the elements of the resulting transformed channel matrices involves square-root operations that are costly to implement.

Accordingly, there is a need for an efficient square-root free 2 symbol max-log receiver.

SUMMARY

A method for a square-root free 2 symbol max-log receiver includes obtaining linear transformations of a received two stream signal and a channel matrix without implementing square-root operations, listing out all possibilities for a first symbol of the received two stream signal, building look-up-tables needed for computing first metrics associated with all possibilities for a first symbol of the two stream signal, determining a second symbol of the two stream signal for each the first symbol listed out, evaluating said first metrics for each the first symbol and second symbol pair using the look up tables, listing out all possibilities for the second symbol 2, building look-up-tables needed for computing second metrics associated with all possibilities for a second symbol of said received two stream signal, determining a first symbol for each choice of the second symbol listed out, evaluating the second metrics for each the second symbol and first symbol pair using the look up tables, determining an exact max-log log likelihood ratio for each coded bit using the second metrics; and decoding a least one codeword in the two stream signal using the determined exact max-log log likelihood ratios for all bits.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
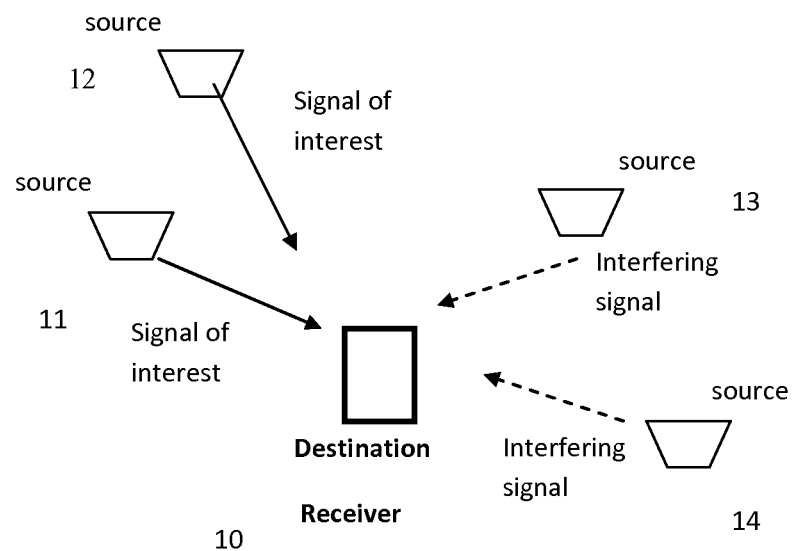
FIG. 1 is a diagram of an exemplary system schematic in which the present inventive principles can be practiced.

Referring now in detail to the figures in which like numerals represent the same or similar elements and initially to FIG. 1, is a diagram of an exemplary system schematic in which the present inventive principles can be practiced. A destination receiver 10 receives signals of interest 11, 12 as well as interfering signals. This invention improves upon the prior method noted above by employing a new way of linear transformations and metric computations that are square-root free.

Figure 2:
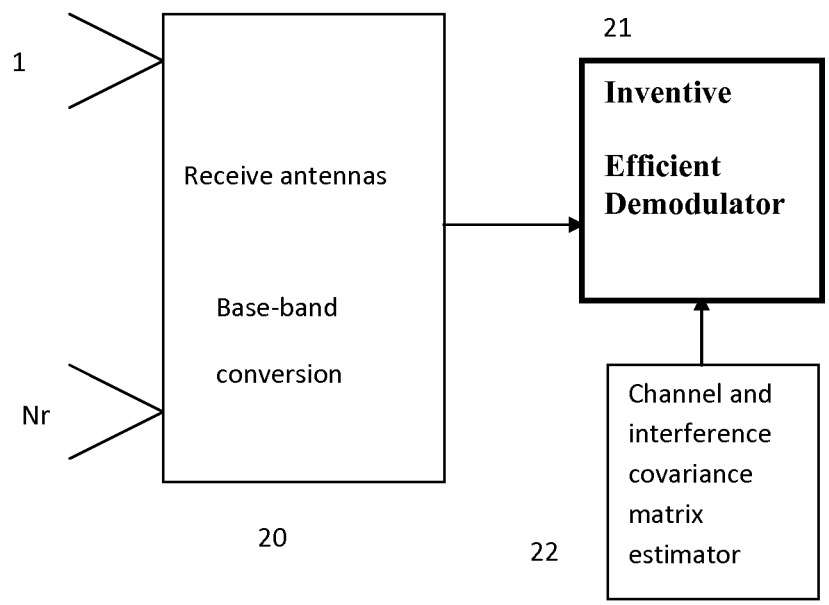
FIG. 2 is a block diagram of a receiver configuration in accordance with the invention.

The present invention employs a look up table based implementation for the metric computations which eliminate redundancy and substantially reduce the number of multiplications. Moreover, inventive method exploits the fact that the un-normalized constellation symbols are complex integers so that the product of a real-number and an un-normalized constellation symbol can be implemented by only additions. The inventive method also enables a greater efficiency for whitening colored noise prior to demodulation, one of which involves no square-root operation. The invention results in less complexity, faster operation, lower power consumption, without sacrificing performance Referring now to FIG. 2, the block diagram shows a receiver configuration in accordance with the invention. The block 20 coupled to receive antennas 1 . . . Nr provides base-band converted output to the inventive efficient modulator 21 that is influenced by a channel and interference covariance matrix estimator 22. The key ingredients of the present invention are square-root free operation and look-up table based implementation.

Detailed Process

Signal Model:

$$z = H \begin{bmatrix} E^{(0)} & 0 \\ 0 & E^{(1)} \end{bmatrix} \begin{bmatrix} x^{(0)} \\ x^{(1)} \end{bmatrix} + \begin{bmatrix} n^{(0)} \\ n^{(1)} \end{bmatrix}$$

-continued $$z = H \begin{bmatrix} E^{(0)} & 0 \\ 0 & E^{(1)} \end{bmatrix} x + n = \bar{H}x + n$$

Equation 1: Rx Signal Model for Spatial Multiplexing

Where $\bar{H}$ is effective channel matrix of size $N_r \times 2$, $N_r$ being the number of receive antennas, $n \sim N_c(0,I)$ and x is a vector of un-normalized QAM symbols. $E^{(0)}$, $E^{(1)}$ are normalizing factors such that $E^{(0)}x^{(0)}$, $E^{(1)}x^{(1)}$ have unit average energy. Thus, $x^{(0)}$, $x^{(1)}$ are un-normalized QAM symbols.

Given
Received vector z,
Estimate $\tilde{H}=[\tilde{h}_0, \tilde{h}_1]$ of effective channel matrix $\bar{H}$
Using QR decomposition, $\tilde{H}$ can be factored as $$\tilde{H}=QR \quad \text{Equation 2}$$

Where Q is $N_r \times 2$ semi-unitary matrix i.e. $Q^H Q = I$ and R is $2 \times 2$ upper triangular matrix that can be expanded as $$R = \begin{bmatrix} r_{0,0} & r_{0,1} \\ 0 & r_{1,1} \end{bmatrix}$$

Square-Root Free Operation

Figure 3:
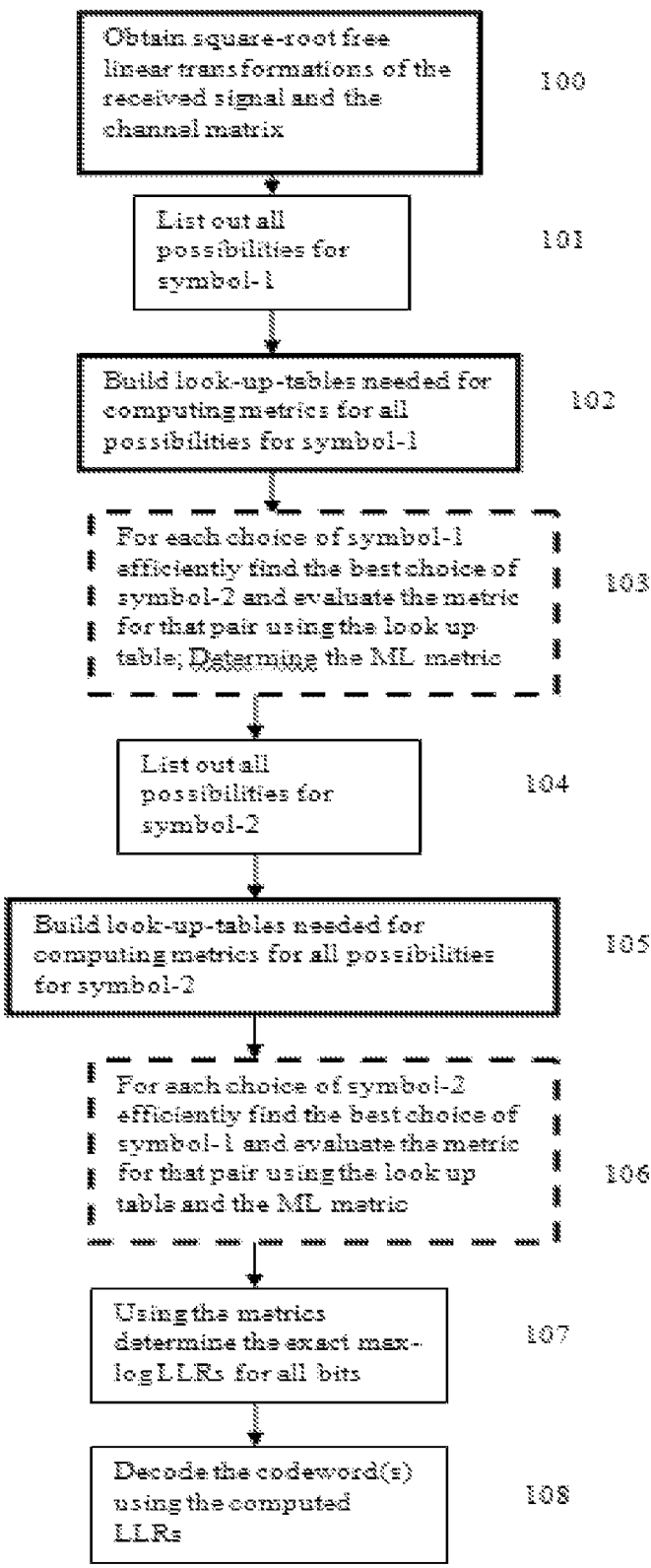
FIG. 3 is a flow diagram for an efficient square-root free 2 symbol max-log receiver, in accordance with the invention.

Referring now to the flow diagram of FIG. 3 showing an efficient square-root free 2 symbol max-log receiver, in accordance with the invention, the square-root free linear transformations of the received signal and the channel matrix 100 is obtained as described below.

Obtain $$\tilde{Q} = Q \begin{bmatrix} 1/r_{0,0} & 0 \\ 0 & 1/r_{1,1} \end{bmatrix},$$

$$\check{r}_{0,1} = r_{0,1}/r_{0,0}$$

and $$\theta = r_{1,1}^2/r_{0,0}^2$$

Upon multiplying received vector z with $\tilde{Q}^H$ we have $$\tilde{z} = \tilde{Q}^H z = \tilde{Q}^H(QRx+n) = \tilde{R}x + \tilde{n} \quad \text{Equation 3}$$

$$\tilde{z} = \begin{bmatrix} \tilde{z}^{(0)} \\ \tilde{z}^{(1)} \end{bmatrix} = \begin{bmatrix} 1 & r_{0,1}/r_{0,0} \\ 0 & 1 \end{bmatrix} \begin{bmatrix} x^{(0)} \\ x^{(1)} \end{bmatrix} +$$

$$\tilde{n} = \begin{bmatrix} x^{(0)} + \check{r}_{0,1}x^{(1)} \\ x^{(1)} \end{bmatrix} + \begin{bmatrix} \tilde{n}^{(0)} \\ \tilde{n}^{(1)} \end{bmatrix}$$

Note that since $Q^H Q = I \Rightarrow \tilde{n} \sim N_c(0, \text{diag}\{1/r_{0,0}^2, 1/r_{1,1}^2\})$.

To implement the inventive procedure, the term $\tilde{Q}$, $\check{r}_{0,1}$, $r_{1,1}^2$ and $\theta$ needs to be determined. Also note that $r_{1,1}^2$ and $\theta$ are both real and positive valued, whereas $\check{r}_{0,1}$ is complex valued. The computation of these quantities is described in the following. Note that no square-root operations are involved.

Obtaining $\tilde{Q}, \check{r}_{0,1}, r_{1,1}^2$ and $\theta$ via a modified QR decomposition (For any $N_r \geq 2$), use $\tilde{H}$ in the following steps Step 1: Consider $\tilde{H}=[\tilde{h}_0, \tilde{h}_1]$ and obtain $$\alpha = \tilde{h}_0^H \tilde{h}_1$$

Step 2: Obtain $\delta = \|\tilde{h}_0\|^2$ and first column of $\tilde{Q}=[\tilde{q}_0, \tilde{q}_1]$ as $$\tilde{q}_0 = \tilde{h}_0/\delta$$

Step 3: Obtain the vector $\tilde{v} = \tilde{h}_1 - \alpha \tilde{q}_0$; and $r_{1,1}^2 = \|\tilde{v}\|^2$ and the second column of $\tilde{Q}=[\tilde{q}_0, \tilde{q}_1]$ as $$\tilde{q}_1 = \tilde{v}/r_{1,1}^2$$

Step 4: Obtain $\check{r}_{0,1}$ as $$\check{r}_{0,1} = \alpha/\delta$$

Step 5: Obtain $\theta$ as $$\theta = r_{1,1}^2/\delta.$$

Referring now to FIG. 3 and blocks 103 and 106, the following are denoted:
- $K^{(v)}$ as number of symbols in modulation constellation applied to layer v. $K^{(v)}$ has value 4,16 and 64 if modulation is QPSK, 16QAM and 64QAM respectively
- $S^{(v)}$ as the set containing $K^{(v)}$ modulation symbols in the modulation constellation applied to layer v.
- $B^{(v)}$ as a number of bits per modulation symbol applied to layer v. $B^{(v)}$ has value 2, 4 and 6 if modulation is QPSK, 16QAM and 64QAM respectively The soft bit k:k=0, 1, ... $B^{(v)}-1$, correspond to transmitted symbol $x^{(v)}$: v=0, 1 are generated using max-log approximation of LLR as follows:

$$L(b_{k,v}) \approx \min_{c_j \in S_{k,v,0}} (\tilde{z} - \tilde{R}c_j)^H \begin{bmatrix} r_{0,0}^2 & 0 \\ 0 & r_{1,1}^2 \end{bmatrix} (\tilde{z} - \tilde{R}c_j) - \min_{c_j \in S_{k,v,1}} (\tilde{z} - \tilde{R}c_j)^H \begin{bmatrix} r_{0,0}^2 & 0 \\ 0 & r_{1,1}^2 \end{bmatrix} (\tilde{z} - \tilde{R}c_j) \quad \text{Equation 4}$$

Where
Vector $c_j = [c_j^{(0)}, c_j^{(1)}]^T$ with each element $c_j^{(v)}$ being a complex symbol in the modulation constellation applied to layer v.

$S_{k,v,1}$ and $S_{k,v,0}$ denote the set containing all possible vector $c_j$ such that bit k of element $c_j^{(v)}$ is equal to 1 and 0 respectively.

For example, if QPSK is used on layer v=0 and 16QAM is used on layer v=1 then
$S_{k,0,1}$ and $S_{k,0,0}$ each contains 2×16=32 vectors
$S_{k,1,1}$ and $S_{k,1,0}$ each contains 8×4=32 vectors Since full computation according to Equation 4 results in undesirably high complexity, further simplification is needed and is explained below. Note that the following simplification results in no loss of optimality when compared to (Equation 4). In other words, the soft bits generated below are identical respectively to the ones generated using (Equation 4).

Considering soft bit calculation for the second layer (i.e. v=1), following steps are performed
Step 1: for each $c_j^{(1)} \in S^{(1)}$: j=0, 1, ..., $K^{(1)}-1$,
Compute $d_j^{(1)} = \theta |\tilde{z}^{(1)} - c_j^{(1)}|^2$ (see Equation 3)
Compute soft estimate $\tilde{z}^{(0)} - \check{r}_{0,1}c_j^{(1)}$ (see Equation 3) and then select a symbol $\hat{c}_j^{(0)} \in S^{(0)}$ that is closest to $\tilde{z}^{(0)} - \check{r}_{0,1}c_j^{(1)}$
Compute $d_j^{(0)} = |\tilde{z}^{(0)} - \hat{c}_j^{(0)} - \check{r}_{0,1}c_j^{(1)}|^2$
Compute total distance $d_j^{TOTAL} = d_j^{(0)} + d_j^{(1)}$ Step 2:
Determine $$\hat{d}^{(1)} = \min_{c_j^{(1)} \in S^{(1)}} \{d_j^{TOTAL}\},$$

$$\hat{c}_j^{(1)} = \operatorname{argmin}_{c_j^{(1)} \in S^{(1)}} \{d_j^{TOTAL}\}$$

and note that $\hat{c}_j^{(1)} \in S^{(1)}$ is the symbol of layer-1 in the maximum likelihood (ML) decision. Let $\hat{b}_{k,1}$: $k=0, 1, \ldots, B^{(1)}-1$ be the bit-label of $\hat{c}_j^{(1)} \in S^{(1)}$ Compute each soft bit $L(b_{k,1})$: $k=0, 1, \ldots, B^{(1)}-1$ as $$L(b_{k,1}) = r_{0,0}^2 \left( \hat{d}^{(1)} - \min_{d_m^{TOTAL} \in D_k^1} d_m^{TOTAL} \right) \text{ if } \hat{b}_{k,1} = 0 \quad \text{Equation 5b}$$

or $$L(b_{k,1}) = r_{0,0}^2 \left( \min_{d_m^{TOTAL} \in D_k^0} d_m^{TOTAL} - \hat{d}^{(1)} \right) \text{ if } \hat{b}_{k,1} = 1;$$

Where $D_k^1$ and $D_k^0$ denotes the set containing all distances $d_j^{TOTAL}$ correspond to $c_j^{(1)}$ that has that bit k equal to 1 and 0 respectively.

Considering soft bit calculation for the first layer (i.e. v=0), following steps are performed Step A: Swapping of symbol vector x and estimate of effective channel matrix $\tilde{H}$ as $$x' = \begin{bmatrix} x^{(1)} \\ x^{(0)} \end{bmatrix}$$

and $$\tilde{H}' = [\tilde{h}_1, \tilde{h}_0]$$

Step B: Perform QR decomposition as shown in Equation 2 (using $\tilde{H}'$ instead of $\tilde{H}$) and multiply receive vector with $\tilde{Q}^H$ as shown in Equation 3

Step 1 and Step 2 are similar to description above with appropriate swapping i.e. $S^{(1)}$, $S^{(0)}$, $K^{(1)}$, $B^{(1)}$, $L(b_{k,1})$ being replaced by $S^{(0)}$, $S^{(1)}$, $K^{(0)}$, $B^{(0)}$, $L(b_{k,0})$ respectively.

Attention is now directed to Look-Up-Table (LUT) based metric computations denoted in blocks 102 and 105 of FIG. 3. In this section we simplify the computations involved in determining $d_j^{(0)}$, $d_j^{(1)}$. This is particularly important when at least one of the two constellations is 64 QAM. The key ideas we use are the following:

1. We look at the max-log LLR expression and after expanding $d_j^{(0)}$, $d_j^{(1)}$, we drop the terms that do not influence the LLR.
2. In the model in (Equation 1) we pull out normalizing factors so that the modulation symbols are from un-normalized QAM constellations which contain integers. Then we can use the fact that the product of an integer and a real number can be obtained using just additions.
3. We also form LUTs containing common terms that mostly depend only on the channel coefficients. The entries of these LUTs are repeatedly accessed while computing all $d_j^{(0)}$, $d_j^{(1)}$ and multiplications are avoided.

Consider the step: Compute $d_j^{(1)} = \theta |\tilde{z}^{(1)} - c_j^{(1)}|^2$
Note that we can expand it as $$d_j^{(1)} = \theta |\tilde{z}^{(1)}|^2 + \theta(c_{j,R}^{(1)})^2 + \theta(c_{j,I}^{(1)})^2 - 2\tilde{z}_R^{(1)} c_{j,R}^{(1)} \theta - 2\tilde{z}_I^{(1)} c_{j,I}^{(1)} \theta \quad \text{(Equation 10)}$$

From (Equation 4b), we can conclude that computing (Equation 10) instead as $$d_j^{(1)} = \theta(c_{j,R}^{(1)})^2 + \theta(c_{j,I}^{(1)})^2 - 2\tilde{z}_R^{(1)} c_{j,R}^{(1)} \theta - 2\tilde{z}_I^{(1)} c_{j,I}^{(1)} \theta \quad \text{(Equation 11)}$$

results in no loss of max-log LLR optimality. Then since $c_j^{(1)}$ belongs to the un-normalized QAM constellation $S^{(1)} = S_R^{(1)} + iS_I^{(1)}$, where $S_R^{(1)}$, $S_I^{(1)}$ are both identical un-normalized PAM constellations of size $M^{(1)} = \sqrt{K^{(1)}}$ and given by $\{-(M^{(1)}-1), -(M^{(1)}-3), \ldots, -1, 1, \ldots, (M^{(1)}-3), (M^{(1)}-1)\}$. Then in a one dimensional (1-D) LUT of length $M^{(1)}/2$ we can pre-compute and store $\{(M^{(1)}-1)^2\theta, (M^{(1)}-3)^2\theta, \ldots, \theta\}$. Note that since the product of any positive integer and any real number can be determined only by additions, this 1-D LUT can be determined only by additions and needs to be updated only if $\theta$ changes. Each $c_{j,R}^{(1)}$ and $c_{j,I}^{(1)}$ should then index the appropriate entry of this LUT via a pre-defined mapping rule to obtain $(c_{j,R}^{(1)})^2\theta$ and $(c_{j,I}^{(1)})^2\theta$, respectively. Further, two other 1-D LUTs containing $\{2(M^{(1)}-1)\tilde{z}_R^{(1)}\theta, 2(M^{(1)}-3)\tilde{z}_R^{(1)}\theta, \ldots, 2\tilde{z}_R^{(1)}\theta\}$ and $\{2(M^{(1)}-1)\tilde{z}_I^{(1)}\theta, 2(M^{(1)}-3)\tilde{z}_I^{(1)}\theta, \ldots, 2\tilde{z}_I^{(1)}\theta\}$, respectively, can be generated via only addition operations, once the two terms $\tilde{z}_R^{(1)}\theta, \tilde{z}_I^{(1)}\theta$ are computed. Then all possibilities of the terms $-2\tilde{z}_R^{(1)} c_{j,R}^{(1)}\theta - 2\tilde{z}_I^{(1)} c_{j,I}^{(1)}\theta$ can be determined using these two 1-D LUTs by accessing the proper entries followed by a negation if needed. Alternatively, once the two terms $\tilde{z}_R^{(1)}\theta, \tilde{z}_I^{(1)}\theta$ are computed, each $-2\tilde{z}_R^{(1)} c_{j,R}^{(1)}\theta - 2\tilde{z}_I^{(1)} c_{j,I}^{(1)}\theta$ can be directly computed using additions. As a result, all $\{d_j^{(1)}\}$ can be computed with only 2 real multiplications.

Next, consider the computation of $$d_j^{(0)} = |\tilde{z}^{(0)} - \hat{c}_j^{(0)} - \check{r}_{0,1} c_j^{(1)}|^2 = (\tilde{z}_R^{(0)} - \hat{c}_{j,R}^{(0)} - \check{r}_{0,1,R} c_{j,R}^{(1)} + \check{r}_{0,1,I} c_{j,I}^{(1)})^2 + (\tilde{z}_I^{(0)} - \hat{c}_{j,I}^{(0)} - \check{r}_{0,1,R} c_{j,I}^{(1)} - \check{r}_{0,1,I} c_{j,R}^{(1)})^2 \quad \text{(Equation 12)}$$

Consider the first term in (Equation 12) which is $(\tilde{z}_R^{(0)} - \hat{c}_{j,R}^{(0)} - \check{r}_{0,1,R} c_{j,R}^{(1)} + \check{r}_{0,1,I} c_{j,I}^{(1)})^2$. Suppose that we have computed via simple quantizing the terms $\{\tilde{z}_R^{(0)} - \hat{c}_{j,R}^{(0)} - \check{r}_{0,1,R} c_{j,R}^{(1)} + \check{r}_{0,1,I} c_{j,I}^{(1)}\}$ for all $c_j^{(1)} = c_{j,R}^{(1)} + i c_{j,I}^{(1)}$. Note that there are $K^{(1)}$ such terms and our objective is to compute the squares of these terms as efficiently as possible. The obvious method would entail $K^{(1)}$ real multiplications. Here we propose an LUT based efficient method and to illustrate, we consider 64 QAM so that $c_{j,R}^{(1)}$ and $c_{j,I}^{(1)}$ each belong to the set $\{-7, -5, \ldots, -1, 1, \ldots, 5, 7\}$. Then, suppose that for any fixed $c_{j_1}^{(1)} = a_R - i7$, we have computed the term $w = \gamma_{R,j} - \hat{c}_{j_1,R}^{(0)} - 7\check{r}_{0,1,I}$ and $w^2$, where $\gamma_{R,j} = \tilde{z}_R^{(0)} - \check{r}_{0,1,R} a_R$. Moreover, suppose that for any $c_{j_2}^{(1)} = a_R + iq$, $q = \{-5, -3, \ldots, 7\}$ we have determined $u = \gamma_{R,j} - \hat{c}_{j_2,R}^{(0)} + q\check{r}_{0,1,I}$. Then letting $\hat{d} = \hat{c}_{j_2,R}^{(0)} - \hat{c}_{j_1,R}^{(0)}$ we see that $u^2$ can be expanded as $$u^2 = w^2 + 2(7+q)w\check{r}_{0,1,I} - 2\hat{d}w + \hat{d}^2 + ((7+q)\check{r}_{0,1,I})^2 - 2\hat{d}(7+q)\check{r}_{0,1,I} \quad \text{(Equation 13)}$$

Note in (Equation 13) that if $w^2$, $\check{r}_{0,1,I}$, $(\check{r}_{0,1,I})^2$, $w\check{r}_{0,1,I}$ are available then $u^2$ can be determined via only addition (or subtraction which can be considered equivalent to an addition) operations since $\hat{d}$ is an integer and the product of an integer, say 3, and a real number, say x, is equal to x+x+x.

To efficiently determine any such $u^2$, we construct a 2-D LUT which for a given pair $\hat{d}$, q yields $\hat{d}^2 + ((7+q)\check{r}_{0,1,I})^2 - 2\hat{d}(7+q)\check{r}_{0,1,I}$. Since all possible $\hat{d}$, q are integer pairs, this 2-D LUT can be constructed using only addition operations and needs to be updated only if $\check{r}_{0,1,I}$ changes. Furthermore, for a given pair w, $w\check{r}_{0,1,I}$ the quantities $\{2(7+q)w\check{r}_{0,1,I}\}$ and $\{2\hat{d}w\}$ can either be directly computed using additions or can be recursively updated (again using additions) as q is varied from −5 to 7 in steps of 2. Thus, for a given $\check{r}_{0,1,I}$, $(\check{r}_{0,1,I})^2$ only two real multiplications (i.e., those needed to compute $w^2$, $w\check{r}_{0,1,I}$) are required to determine all $\{(\tilde{z}_R^{(0)} - \hat{c}_{j,R}^{(0)} - \check{r}_{0,1,R} c_{j,R}^{(1)} + \check{r}_{0,1,I} c_{j,I}^{(1)})^2\}$, $c_{j,R}^{(1)} = a_R$, $c_{j,R}^{(1)} = q$ for any fixed $a_R$ as q is varied from −5 to 7 in steps of 2. It can be similarly shown that given $\check{r}_{0,1,R}$, $(\check{r}_{0,1,R})^2$ only one more additional real multiplication (needed to compute $w\check{r}_{0,1,R}$) is required to determine all $\{(\tilde{z}_R^{(0)} - \hat{c}_{j,R}^{(0)} - \check{r}_{0,1,R} c_{j,R}^{(1)} + \check{r}_{0,1,I} c_{j,I}^{(1)})^2\}$, $c_{j,R}^{(1)} = a_R$, $c_{j,I}^{(1)} = q$ for any fixed $a_R$ as q is varied from −5 to 7 in steps of 2. Thus, all $\{(\tilde{z}_R^{(0)} - \hat{c}_{j,R}^{(0)} - \check{r}_{0,1,R} c_{j,R}^{(1)} + \check{r}_{0,1,I} c_{j,I}^{(1)})^2\}$ for all $c_j^{(1)}$ can be determined with 10 real multiplications. Similarly all possibilities of the second term in (Equation 12) which are $\{(\tilde{z}_I^{(0)} - \hat{c}_{j,I}^{(0)} - \check{r}_{0,1,I} c_{j,R}^{(1)} + \check{r}_{0,1,R} c_{j,I}^{(1)})^2\}$ be determined with 10 real multiplications. Consequently all $\{d_0^{(1)}\}$ can be computed with only 20 real multiplications.

Detailed Implementation (for 2 RX)

1.1 Second Layer Processing

Set v=0
$S^A = S^{(1)}$
$S^B = S^{(0)}$
$K^A = K^{(1)}$
$B^A = B^{(1)}$

Then perform processing as described in subsections below. After completing processing in 1.1.4, assign $L(b_{k,1}) = L(b_k)$ 1.1.1 Process Received Input $$\tilde{z} = \begin{bmatrix} \tilde{z}^{(0)} \\ \tilde{z}^{(1)} \end{bmatrix} = \tilde{Q}^H z \quad \text{Equation 6}$$

Obtain $\check{r}_{0,1}$, $r_{1,1}^2$ and $\theta$.

1.1.2 Distance Calculation 1

For each $c_j^A \in S^A$: $j = 0, 1, \ldots, K^A - 1$,

Step 1: Compute $$d_j^A = \theta |\tilde{z}^{(1)} - c_j^A|^2 \quad \text{Equation 7}$$

Note that the computation in Equation 15 can be simplified using LUT as described above Step 2: Compute the soft estimate $$\tilde{c}_j^B = \tilde{z}^{(0)} - \check{r}_{0,1} c_j^A \quad \text{Equation 8}$$

and compute $\hat{c}_j^B$ which is the symbol in $S^B$ closest to a $\tilde{c}_j^B$ via quantization.

1.1.2 Distance Calculation 2

Step 1: Compute $$d_j^B = |\tilde{z}^{(0)} - \hat{c}_j^B - \check{r}_{0,1} c_j^A|^2 : j = 0, 1, \ldots, K^A - 1 \quad \text{Equation 9}$$

Note that the computation in Equation 17 can be significantly simplified using LUTs as described above Step 2: Compute $$d_j^{TOTAL} = d_j^B + d_j^A : j = 0, 1, \ldots, K^A - 1 \quad \text{Equation 10}$$

Determine $$\hat{d}^{TOTAL} = \min_{j=0,1,\ldots,K^A-1} \{d_j^{TOTAL}\},$$

$$\hat{j} = \operatorname*{argmin}_{j=0,1,\ldots,K^A-1} \{d_j^{TOTAL}\}$$

and let $\hat{b}_k$: $k = 0, 1, \ldots, B^A - 1$ be the bit-label of $c_{\hat{j}}^{(A)}$.

Soft Bit Calculation

Compute each soft bit $L(b_k)$: $k = 0, 1, \ldots, B^A - 1$ as $$L(b_k) = r_{0,0}^2 \left( \hat{d}^{TOTAL} - \min_{d_m^{TOTAL} \in D_k^1} d_m^{TOTAL} \right) \text{ if } \hat{b}_k = 0 \quad \text{Equation 11}$$

or $$L(b_k) = r_{0,0}^2 \left( \min_{d_m^{TOTAL} \in D_k^0} d_m^{TOTAL} - \hat{d}^{TOTAL} \right) \text{ if } \hat{b}_k = 1$$

Where $D_k^1$ and $D_k^0$ denotes the set containing all distances $d_j^{TOTAL}$ correspond to $c_j^A$ that has bit k equal to 1 and 0 respectively.

First Layer Processing

There is pre-processing step which involve swapping of symbol vector x and estimate of effective channel matrix $\tilde{H}$ to obtain as vector x' and matrix $\tilde{H}'$ as follow $$x' = \begin{bmatrix} x^{(1)} \\ x^{(0)} \end{bmatrix}; \quad \text{Equation 20}$$

$$\tilde{H}' = \begin{bmatrix} \tilde{h}_{1,1} & \tilde{h}_{1,0} \\ \tilde{h}_{0,1} & \tilde{h}_{0,0} \end{bmatrix}$$

Set v=1
$S^A = S^{(0)}$
$S^B = S^{(1)}$
$K^A = K^{(0)}$
$B^A = B^{(0)}$

Then perform processing as described in subsections below. After completing processing in 1.2.4, assign $L(b_{k,0}) = L(b_k)$.

Computations Via QR Decomposition

As described before with $\tilde{H}$ being replaced by $\tilde{H}'$. Note that some computations made for deriving the first QR decomposition can be re-used.

Process received input: As in 1.1.1 with x being replaced by x'.

Distance Calculation 1: As in 1.1.2.

Distance calculation 2: As in [0037].

Soft bit calculation: As in 1.1.4

Noise-Whitening

Consider the received signal model at UE of interest having index 0 and let UE with index 1 be the co-scheduled user.

$$y_0 = H_0 V_0 x_0 + H_0 V_1 x_1 + n_0$$

$$= \tilde{H}_0 x_0 + \hat{H}_0 x_1 + n_0, y_0 \in C^{2 \times 1}, n_0 \in C^{2 \times 1},$$

$$H_0 \in C^{2 \times 4}, V_k \in C^{4 \times 2}, x_k \in C^{2 \times 1}$$

$$\tilde{H}_0 \in C^{2 \times 2}, \hat{H}_0 \in C^{2 \times 2}$$

Assuming that UE-0 can estimate $\tilde{H}_0$, $\hat{H}_0$, we will derive the whitening process. The whitening process can be done using a Cholesky decomposition of the noise-plus-interference covariance matrix.

In particular, we compute the covariance matrix as $C = E[(\hat{H}_0 x_1 + n_0)(\hat{H}_0 x_1 + n_0)^*] = I + \hat{H}_0 \hat{H}_0^*$ where we have assumed $E[x_1 x_1^*] = E[n_0 n_0^*] = I$. Note that if we have estimated $\hat{H}_0$ we can use it to compute C or we can determine C using covariance estimation. We can then determine the Cholesky decomposition of C as $C = LL^*$ where L is a lower or upper triangular matrix with positive diagonal elements. We then determine $L^{-1}$ and $L^{-1} y_0$ which can be expanded as $z_0 = L^{-1} y_0 = L^{-1} \tilde{H}_0 x_0 +$ ñ and note that $E[\tilde{n}\tilde{n}^*]=I$. We can use the two-symbol demodulator derived above on $z_0$ with $L^{-1}\tilde{H}_0$ being the effective channel matrix.

In the special case when C is a 2×2 matrix we can obtain the following closed form expressions: Let $$C = \begin{bmatrix} a & c \\ b & d \end{bmatrix}$$

and note that since C is positive definite we must have $a>0$, $d>0$ and $b=c^*$. Let L be lower triangular with positive diagonal elements. Then we can determine elements of L as $$L = \begin{bmatrix} l_{11} & 0 \\ l_{21} & l_{22} \end{bmatrix},$$

$$l_{11} = \sqrt{a},$$

$$l_{21} = b/l_{11},$$

$$l_{22} = \sqrt{d - |l_{21}|^2}.$$

The inverse of L can now be computed as $$L^{-1} = \begin{bmatrix} 1/l_{11} & 0 \\ -l_{21}/(l_{11}l_{22}) & 1/l_{22} \end{bmatrix}.$$

Square-Root Free Noise-Whitening

Consider again the received signal model:

$$y_0 = \tilde{H}_0 x_0 + \tilde{n}_0$$

$$E[\tilde{n}_0 \tilde{n}_0^*] = C \quad \text{(Equation 21)}$$

and suppose $$C = \begin{bmatrix} a & c \\ b & d \end{bmatrix}$$

is a 2×2 positive definite matrix. Note that $$C^{-1} = \frac{1}{ad-bc} \begin{bmatrix} d & -c \\ -b & a \end{bmatrix}.$$

Then obtain the following variation of the Cholesky decomposition: $A \triangleq \tilde{H}_0^* C^{-1} H_0 = \tilde{L} D \tilde{L}^*$ where letting $$A = \begin{bmatrix} e & f^* \\ f & h \end{bmatrix}$$

we now have $$\tilde{L} = \begin{bmatrix} 1 & 0 \\ \tilde{l}_{21} & 1 \end{bmatrix},$$

$$D = \begin{bmatrix} l_{11}^2 & 0 \\ 0 & l_{22}^2 \end{bmatrix},$$

$$l_{11}^2 = e,$$

$$\tilde{l}_{21} = f/e,$$

$$l_{22}^2 = h - \frac{|f|^2}{e}.$$

Next, we transform the received signal in (Equation 21) as $z_0 = D^{-1}\tilde{L}^{-1}\tilde{H}_0^* C^{-1} y_0$ and note that $z_0$ can be expanded as $z_0 = \tilde{L}^* x_0 + \hat{n}_0$ $$E[\hat{n}_0 \hat{n}_0^*] = \begin{bmatrix} 1/l_{11}^2 & 0 \\ 0 & 1/l_{22}^2 \end{bmatrix}, \quad \text{(Equation 22)}$$

$$\tilde{L}^* = \begin{bmatrix} 1 & \tilde{l}_{21}^* \\ 0 & 1 \end{bmatrix}$$

Note that $z_0$ modeled as in (Equation 22) is precisely the form which allows for square-root-free implementation of two-symbol demodulator derived above (please see Equation 3).

From the above it can be seen that the present invention is advantageous in that it employs a new way of linear transformations and metric computations that are square-root free. The invention employs a look up table based implementation for the metric computations which eliminate redundancy and substantially reduce the number of multiplications. Moreover, inventive method exploits the fact that the un-normalized constellation symbols are complex integers so that the product of a real-number and an un-normalized constellation symbol can be implemented by only additions. The inventive method also enables a greater efficiency for whitening colored noise prior to demodulation, one of which involves no square-root operation. The invention results in less complexity, faster operation, lower power consumption, without sacrificing performance Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims Having thus described aspects of the invention, with the details and particularity required by the patent laws, what is claimed and desired protected by Letters Patent is set forth in the appended claims.

What is claimed is:

1. A method for a square-root free 2 symbol max-log receiver comprising:
   i) obtaining linear transformations of a received two stream signal and a channel matrix without implementing square-root operations;
   ii) listing out all possibilities for a first symbol of the received two stream signal;
   iii) building look-up tables needed for computing first metrics associated with all possibilities for a first symbol of the two stream signal;
   iv) determining a second symbol of the two stream signal for each said first symbol listed out;

v) evaluating said first metrics for each said first symbol and second symbol pair using said look-up tables;

vi) listing out all possibilities for said second symbol;

vii) building look-up tables needed for computing second metrics associated with all possibilities for a second symbol of said received two stream signal;

viii) determining a first symbol for each choice of said second symbol listed out;

ix) evaluating said second metrics for each said second symbol and first symbol pair using the look-up tables;

x) determining an exact max-log log likelihood ratio for each coded bit using said second metrics; and xi) decoding at least one codeword in the two stream signal using the determined exact max-log log likelihood ratios for all bits.

2. The method of claim 1, wherein said step i) obtaining linear transformations of a received signal comprises:

obtaining $$\tilde{Q} = Q \begin{bmatrix} 1/r_{0,0} & 0 \\ 0 & 1/r_{1,1} \end{bmatrix},$$

$$\check{r}_{0,1} = r_{0,1}/r_{0,0}$$

and $$\theta = r_{1,1}^2/r_{0,0}^2.$$

where Q is an $N_r \times 2$ semi-unitary matrix, $N_r$ is the number of receive antennas, R is a 2×2 upper triangular matrix that is expanded as $$R = \begin{bmatrix} r_{o,o} & r_{o,1} \\ 0 & r_{1,1} \end{bmatrix},$$

$\tilde{H} = [\tilde{h}_0, \tilde{h}_1]$ is a channel matrix, and $\tilde{H} = QR$.

3. The method of claim 2, wherein said step i) obtaining linear transformations of a received signal comprises:

multiplying a received vector z with $\tilde{Q}^H$ giving $$\tilde{z} = \tilde{Q}^H z = \tilde{Q}^H (QRx+n) = \check{R}x + \tilde{n},$$

where $$\tilde{z} = \begin{bmatrix} \tilde{z}^{(0)} \\ \tilde{z}^{(1)} \end{bmatrix} = \begin{bmatrix} 1 & r_{0,1}/r_{0,0} \\ 0 & 1 \end{bmatrix} \begin{bmatrix} x^{(0)} \\ x^{(1)} \end{bmatrix} + \tilde{n} = \begin{bmatrix} x^{(0)} + \check{r}_{0,1} x^{(1)} \\ x^{(1)} \end{bmatrix} + \begin{bmatrix} \tilde{n}^{(0)} \\ \tilde{n}^{(1)} \end{bmatrix},$$

$Q^H Q = I$ with $\tilde{n} \sim N_c(0, \text{diag}\{1/r_{0,0}^2, 1/r_{1,1}^2\})$.

4. The method of claim 1, wherein said step i) obtaining linear transformations of a received signal comprises:

obtaining $\tilde{Q}, \check{r}_{0,1}, r_{1,1}^2$ and $\theta$ via a modified QR decomposition for any $N_r \geq 2$;

using the channel matrix $\tilde{H}$;

considering $\tilde{H} = [\tilde{h}_0, \tilde{h}_1]$; and obtaining $\alpha = \tilde{h}_0^H \tilde{h}_1$.

5. The method of claim 1, wherein said step i) obtaining linear transformations of a received signal comprises:

$\tilde{Q}, \check{r}_{0,1}, r_{1,1}^2$ and $\theta$ via a modified QR decomposition for any $N_r \geq 2$;

using the channel matrix $\tilde{H} = [\tilde{h}_0, \tilde{h}_1]$; and obtaining $\delta = \|\tilde{h}_0\|^2$ and a first column of $\tilde{Q} = [\tilde{q}_0, \tilde{q}_1]$ as $\tilde{q}_0 = \tilde{h}_0/\delta$.

6. The method of claim 1, wherein said step i) obtaining linear transformations of a received signal comprises:

obtaining $\tilde{Q}, \check{r}_{0,1}, r_{1,1}^2$ and $\theta$ via a modified QR decomposition for any $N_r \geq 2$;

using the channel matrix $\tilde{H} = [\tilde{h}_0, \tilde{h}_1]$; and obtaining a vector $\tilde{v} = \tilde{h}_1 - \alpha \tilde{q}_0$, where $\alpha = \tilde{h}_0^H \tilde{h}_1$, $r_{1,1}^2 = \|\tilde{v}\|^2$, and a second column of $\tilde{Q} = [\tilde{q}_0, \tilde{q}_1]$ as $\tilde{q}_1 = \tilde{v}/r_{1,1}^2$.

7. The method of claim 1, wherein said step i) obtaining linear transformations of a received signal comprises:

obtaining $\tilde{Q}, \check{r}_{0,1}, r_{1,1}^2$ and $\theta$ via a modified QR decomposition for any $N_r \geq 2$;

using the channel matrix $\tilde{H} = [\tilde{h}_0, \tilde{h}_1]$; and obtaining $\check{r}_{0,1}$ as $\check{r}_{0,1} = \alpha/\delta$, where $\alpha = \tilde{h}_0^H \tilde{h}_1$ and $\delta = \|\tilde{h}_0\|^2$.

8. The method of claim 1, wherein said step i) obtaining linear transformations of a received signal comprises:

obtaining $\tilde{Q}, \check{r}_{0,1}, r_{1,1}^2$ and $\theta$ via a modified QR decomposition for any $N_r \geq 2$;

using the channel matrix $\tilde{H} = [\tilde{h}_0, \tilde{h}_1]$; and obtaining $\theta$ as $\theta = r_{1,1}^2/\delta$, where $\delta = \|\tilde{h}_0\|^2$.

9. The method of claim 1, wherein said step iv), v) or viii), ix) comprises:

generating a soft bit k:k=0, 1, . . . $B^{(v)}-1$, corresponding to transmitted symbol $x^{(v)}$:v=0,1 using max-log approximation of a likelihood ratio (LLR) as follows:

$$L(b_{k,v}) \approx \min_{c_j \in S_{k,v,0}} (\tilde{z} - \check{R}c_j)^H \begin{bmatrix} r_{0,0}^2 & 0 \\ 0 & r_{1,1}^2 \end{bmatrix} (\tilde{z} - \check{R}c_j) - \min_{c_j \in S_{k,v,1}} (\tilde{z} - \check{R}c_j)^H \begin{bmatrix} r_{0,0}^2 & 0 \\ 0 & r_{1,1}^2 \end{bmatrix} (\tilde{z} - \check{R}c_j),$$

wherein a vector $c_j = [c_j^{(0)}, c_j^{(1)}]^T$ with each element $c_j^{(v)}$ is a complex symbol in a modulation constellation applied to layer v, $S_{k,v,1}$ and $S_{k,v,0}$ denote a set containing all possible vector $c_j$ such that bit k of element $c_j^{(v)}$ is equal to 1 and 0 respectively, Q is an $N_r \times 2$ semi-unitary matrix, $N_r$ is the number of receive antennas, R is a 2×2 upper triangular matrix that is expanded as $$R = \begin{bmatrix} r_{o,o} & r_{o,1} \\ 0 & r_{1,1} \end{bmatrix},$$

$\tilde{H} = [\tilde{h}_0, \tilde{h}_1]$ is a channel matrix, $\tilde{H} = QR$, $\tilde{z} = \tilde{Q}^H z = \tilde{Q}^H (QRx+n) = \check{R}x + \tilde{n}$, and $$\tilde{z} = \begin{bmatrix} \tilde{z}^{(0)} \\ \tilde{z}^{(1)} \end{bmatrix} = \begin{bmatrix} 1 & r_{0,1}/r_{0,0} \\ 0 & 1 \end{bmatrix} \begin{bmatrix} x^{(0)} \\ x^{(1)} \end{bmatrix} + \tilde{n} = \begin{bmatrix} x^{(0)} + \check{r}_{0,1} x^{(1)} \\ x^{(1)} \end{bmatrix} + \begin{bmatrix} \tilde{n}^{(0)} \\ \tilde{n}^{(1)} \end{bmatrix}.$$

10. The method of claim 1, wherein said step iv), v) or viii), ix) comprises:

generating a soft bit k:k=0, 1, . . . $B^{(v)}-1$, corresponding to transmitted symbol $x^{(v)}$:v=0,1 using max-log approximation of a likelihood ratio (LLR), wherein a vector $c_j = [c_j^{(0)}, c_j^{(1)}]^T$ with each element $c_j^{(v)}$ is a complex symbol in a modulation constellation applied to layer v, and $S_{k,v,1}$ and $S_{k,v,0}$ denote a set containing all possible vector $c_j$ such that bit k of element $c_j^{(v)}$ is equal to 1 and 0 respectively.

11. The method of claim 1, wherein said step iv), v) or viii), ix) comprises:
    considering soft bit calculation for a second layer where v=1;
    performing for each $c_j^{(1)} \epsilon S^{(1)}$:j=0, 1, ..., $K^{(1)}$−1; and
    computing $d_j^{(1)} = \theta|\tilde{z}^{(1)} - c_j^{(1)}|^2$.

12. The method of claim 1, wherein said step iv), v) or viii), ix) comprises:
    considering soft bit calculation for a second layer where v=1;
    performing for each $c_j^{(1)} \epsilon S^{(1)}$:j=0, 1, ..., $K^{(1)}$−1; and
    computing soft estimate $\tilde{z}^{(0)} - \check{r}_{0,1} c_j^{(1)}$, and
    selecting a symbol $\hat{c}_j^{(0)} \epsilon S^{(0)}$ that is closest to $\tilde{z}^{(0)} - \check{r}_{0,1} c_j^{(1)}$.

13. The method of claim 1, wherein said step iv), v) or viii), ix) comprises:
    considering soft bit calculation for a second layer where v=1;
    performing for each $c_j^{(1)} \epsilon S^{(1)}$:j=0, 1, ..., $K^{(1)}$−1; and
    computing $d_j^{(0)} = |\tilde{z}^{(0)} - \hat{c}_j^{(0)} - \check{r}_{0,1} c_j^{(1)}|^2$.

14. The method of claim 1, wherein said step iv), v) or viii), ix) comprises:
    considering soft bit calculation for a second layer where v=1;
    performing for each $c_j^{(1)} \epsilon S^{(1)}$:j=0, 1, ..., $K^{(1)}$−1; and
    computing total distance $d_j^{TOTAL} = d_j^{(0)} + d_j^{(1)}$.

15. The method of claim 1, wherein said step iv), v) or viii), ix) comprises:
    a) determining $$\hat{d}^{(1)} = \min_{c_j^{(1)} \in S^{(1)}} \{d_j^{TOTAL}\},$$

$$\hat{c}_j^{(1)} = \operatorname{argmin}_{c_j^{(1)} \in S^{(1)}} \{d_j^{TOTAL}\},$$

where $\hat{c}_j^{(1)} \epsilon S^{(1)}$ is a symbol of layer−1 in a maximum likelihood (ML) decision and $\hat{b}_{k,1}$:k=0, 1 ..., $B^{(1)}$−1 is a bit-label of $\hat{c}_j^{(1)} \epsilon S^{(1)}$; and b) computing each soft bit $L(b_{k,1})$:k=0, 1, ..., $B^{(1)}$−1 as $$L(b_{k,1}) = r_{0,0}^2 \left( \hat{d}^{(1)} - \min_{d_m^{TOTAL} \in D_k^1} d_m^{TOTAL} \right) \text{ if } \hat{b}_{k,1} = 0$$

or $$L(b_{k,1}) = r_{0,0}^2 \left( \min_{d_m^{TOTAL} \in D_k^0} d_m^{TOTAL} - \hat{d}^{(1)} \right) \text{ if } \hat{b}_{k,1} = 1.$$

c) where $D_k^1$ and $D_k^0$ denote a set containing all distances $d_j^{TOTAL}$ correspond to $c_j^{(1)}$ that has that bit k equal to 1 and 0, respectively.

16. The method of claim 1, wherein said step iii) or vii) comprises:
    looking at a max-log likelihood ratio (LLR) expression; and
    after expanding $d_j^{(0)}$, $d_j^{(1)}$, dropping the terms that do not influence the LLR.

17. The method of claim 1, wherein said step iii) or vii) comprises:
    pulling out normalizing factors so that modulation symbols are from un-normalized quadrature amplitude modulation (QAM) constellations which contain integers.

18. The method of claim 1, wherein said step iii) or vii) comprises:
    forming LUT: containing common terms that depend on a channel coefficient,
    wherein entries of the look-up tables (LUTs) are repeatedly accessed while computing all $d_j^{(0)}$, $d_j^{(1)}$, and multiplications are avoided.

19. The method of claim 1, wherein said step iii) or vii) comprises:
    computing $d_j^{(1)} = \theta(c_{j,R}^{(1)})^2 + \theta(c_{j,I}^{(1)})^2 - 2\tilde{z}_R^{(1)} c_{j,R}^{(1)} \theta - 2\tilde{z}_I^{(1)} c_{j,I}^{(1)} \theta$.

20. The method of claim 1, wherein said step iii) or vii) comprises:
    computing $d_j^{(1)} = \theta|\tilde{z}^{(1)} - c_j^{(1)}|^2$,
    where all $\{d_0^{(1)}\}$ can be computed with only 20 real multiplications.

* * * * *